R. J. Gould,
Dovetailing Machine,
No. 80,942. Patented Aug. 11, 1868.
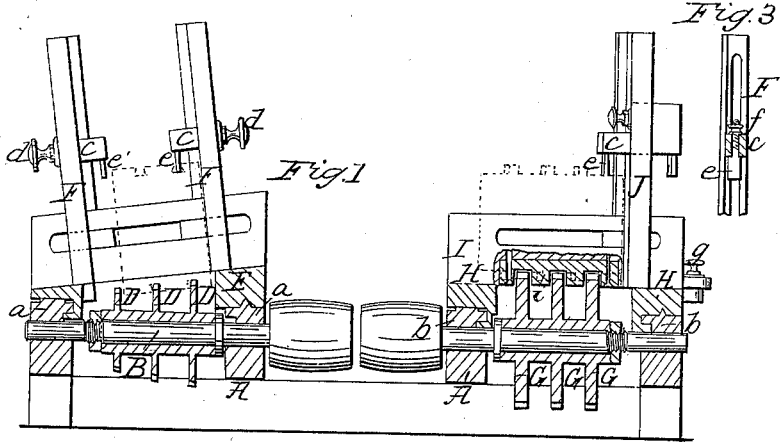
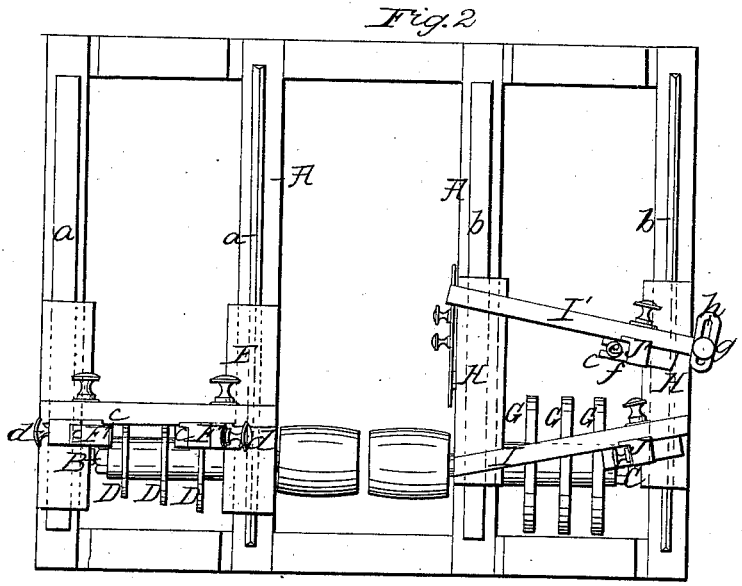

R. J. Gould,
Dovetailing Machine,
N° 80,942. Patented Aug. 11, 1868.
Sheet 2 - 2 Sheets.
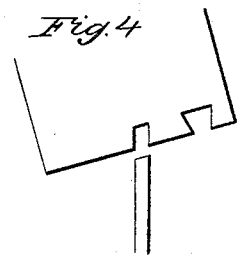
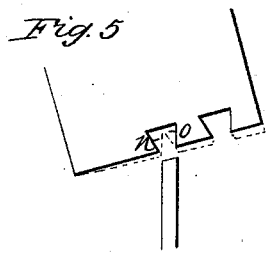
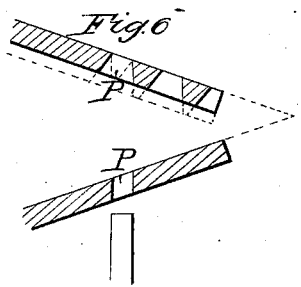
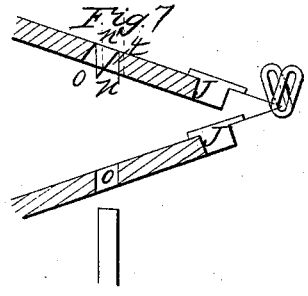
Witnesses:
Inventor:

United States Patent Office.

ROSCOE J. GOULD, OF NEWARK, NEW JERSEY.

*Letters Patent No. 80,942, dated August 11, 1868.*

IMPROVEMENT IN DOVE-TAILING MACHINES.

*The Schedule referred to in these Letters Patent and making part of the same.*

TO ALL WHOM IT MAY CONCERN:

Be it known that I, ROSCOE J. GOULD, of Newark, in the county of Essex, and State of New Jersey, have invented a new and improved Dove-Tailing Machine; and I do hereby declare the following to be a full, clear, and exact description thereof, which will enable those skilled in the art to make and use the same, reference being had to the accompanying drawing, forming part of this specification, in which drawing—

Figure 1 represents a transverse section of this invention.

Figure 2 is a plan or top view of the same.

Figure 3 is a detached sectional view of one of the gauges.

Figures 4, 5, 6, and 7 are diagrams illustrating the manner in which the saws cut.

Similar letters indicate corresponding parts.

This invention relates to certain improvements in that class of dove-tailing machines in which two sets of saws are employed, one set for producing the "tenons," and the other the mortises or grooves.

The invention consists in cutting dove-tails from the bottoms of the grooves, or of the spaces between the "tenons," in such a manner that the distance between said bottoms becomes independent of the edges of the boards, and said distance will be true and correct, even if the opposite edges of a board should not be parallel; also, in the arrangement of adjustable stops, secured to the upright gauges, and made in such a shape that they can be brought to bear on the bottoms of the grooves or spaces between the "tenons," and the operation of cutting the dove-tails from the bottoms of the grooves or spaces is materially facilitated; further, in the arrangement of a movable fulcrum, in combination with the swinging abutment, in such a manner that by adjusting the fulcrum, a certain motion transversely to the carriage is imparted to said abutment according to the desired width of the grooves or the spaces between the "tenons;" also, in the arrangement of a lining of wood, or other soft material, in the bottom edge of the abutment, in such a manner that the boards are supported close to the edges of the grooves or spaces between the "tenons," without exposing the cutting-edges of the saw to any injury, which they would be liable to sustain if the metal body of the abutment should be made to extend clear down; further, in the arrangement of an upright gauge, provided with an adjustable slide in combination with a gang of saws in such a manner that the position of the board in relation to the saws can be readily adjusted; also, in the arrangement of two upright gauges, provided with slides, in one and the same abutment, in such a manner that the cutting of dove-tails from one and the same face or side of the board is facilitated; further, in the arrangement of two stationary abutments extending across the carriage in different directions, and at angles which are supplements to each other, said abutments being provided with upright gauges and slides in such a manner that by placing the boards successively against the abutments, the operation of cutting the dove-tails can be effected from one and the same side or face of the boards.

A represents a frame, which forms the bearings for two shafts, B C, and which is provided with two distinct guide-ways, *a a, b b*, as clearly shown in the drawing.

On the shaft B is mounted a series of saws, D, which serve to cut the "grooves" or mortises, and on the guide-ways *a a* is fitted the carriage E, from which rise the gauges F F'.

The cutting-edges or faces of the saws are oblique, or at an angle toward the longitudinal centre of their axle, and the gauges are so placed that their inner or working faces are exactly at right angles to a line connecting the cutting-edges of the various saws.

Each of the gauges is provided with a slide, *c*, which can be moved up or down in a slot, and which is secured in the desired position by a set-screw, *d*.

Each slide is provided with a slot, to receive a stop, *e e'*, which is secured in the desired position by a nut, *f*, screwing on the shank of the stop. By these means the stop can be adjusted up and down by moving the slide in its slot, and it can also be set closer to or farther from the working face of its gauge, to suit the work to be produced.

The gauges F F' are adjustable in their carriage E, according to the width of the board into which the "grooves" are to be cut, and the distance desired from the edge of the board to the nearest "groove," and according to the desired width of the grooves. After the gauges have been thus adjusted, the slides c are set, so that the stops e and e' are placed at the same distance from the top of the saws, and to correspond to the height or length of the board desired from the inside of the first row of grooves to be cut. The board is placed with one edge against the gauge F, with its upper end bearing against the stop e, and pushing the carriage forward, the board is carried across the saws, and a series of cuts is produced, such as shown in fig. 4.

The board is then reversed, so that the same edge is against the gauge F' that was against gauges F before, leaving the same end up to bear against the stop e', and the board is carried again over the saws, whereby the grooves on one end of the board are finished in the form shown in fig. 5, where the letter o represents the first or old and letter n the second or new cut. After one end of the board has thus been provided with grooves or mortises, the board is turned upside down, and the stops e e' are so adjusted that they will bear against the bottoms or inside of the grooves, as shown in fig. 1. The grooves at the opposite edge of the board are then finished in the same manner as above described.

By bringing the stops e e' to bear on the bottoms of the first row of grooves, the distance between these bottoms and the bottoms of the grooves to be formed at the opposite end becomes absolutely the same in any number of boards, even if the boards should not all be sawed to the same length, while in cutting the grooves, as now practised, the gauges or stops are always brought to bear on the end of the board to be cut, and if the two ends are not perfectly parallel, or the boards not of the same length, the distances between the bottoms of the grooves of the two ends become unequal, and the boxes or other work produced will not be square, whereas, if the distance between the bottoms of the grooves is made exact, as in my machine, the work necessarily becomes square, and the surplus wood projecting beyond the edges can be readily planed off after the several boards have been fitted together, as is done in making dove-tailed joints by hand, leaving the joints smooth and perfect, which would not be the case if the boards were finished to the exact length before being cut. By having the gauges F F' at right angles to the cutting-line of the saws, and always working from the same edge of the board, the bottoms of the grooves will always be at right angles with that edge, which would not be the case if the boards were worked from the end which is being cut, as is generally the way now practised.

For cutting the "tenons," I use a gang of saws, G, which are mounted on the shaft C. This shaft has its bearing in that position of the frame A which is provided with the guide-ways b b, and on these guide-ways is fitted the carriage H.

From this carriage rises the abutment I, which is provided with a slot, so that said gauge can be adjusted to suit the width of the boards and the distance to be cut from the edge. The abutment I is either made stationary or movable. If made stationary, it is placed in an oblique position, to correspond to the shape of the "tenons" to be cut, and a second abutment, I', is provided, which extends across the carriage, at some distance from the first abutment, in a different direction, at an angle with the guide-ways b b, which forms the supplement of the angle made by the abutment I and the guideways b b.

From the abutment I' rises the gauge J', and both gauges J and J' are provided with adjustable slides c and stops e, as previously described.

The board to be cut is placed with one side or face against the abutment I, its edge bearing against the gauge J, which has been previously adjusted to suit the width of board and position of the nearest cut, and the stop e is brought to bear on the end of the board, at the proper distance from the top of the saws, to give the desired depth of cut.

By running the carriage over the saws, a series of cuts, p, is produced, as indicated in fig. 6, then the carriage is run back, the board is placed against the abutment I' with the same side or face which rested against the upright gauge J, and the stop e of gauge J' placed at some distance above the saws, as stop e, on gauge J, then, by passing the carriage again over the saws, the "tenons" are finished. If it is desired to make a cut wider than the saw, the upright gauge J' may be placed in position from the first saw, to make the cut n' as in the dotted lines, fig. 7, instead of the cut n.

The board is then turned upside down, with the same side or face presented to the abutment. And when the two edges of the board are not parallel and true, the gauges J J' may be moved to the opposite end of the abutment, and at the same distance from the first saw on that side as they were from the first saw on the other side. The stops e are each set at the same distance from the saws, and to bear on the bottoms of the spaces between the "tenons" previously cut at one end, and the "tenons" at the opposite end are cut in the same manner as above stated.

By bringing the stops e to bear on the bottoms of the spaces between the "tenons," the distance between these bottoms is rendered absolutely equal, and independent of any irregularity existing in the lengths of the boards, and the work produced becomes square and correct.

It must also be remarked, that in my machine the "tenons" are finished from the same side or face and edge of the board, so that their shape or size will not be influenced by any irregularity in the edges, or by any inequality or variation in the thickness of the boards.

Instead of using two stationary abutments, I need use only one abutment, I', which in this case is secured to its carriage by a pivot, g.

This pivot screws into a lug projecting from the carriage, and it passes through a slot, h, in a lug projecting from the abutment. The object of this slot is to enable the operator to adjust the fulcrum of the abutment, so that said abutment, on being swung on its pivot, will assume at the same time a slight motion transversely to the carriage, whereby the upright gauge I' is brought in the desired position, without the necessity of unscrewing said gauge and moving it in the abutment. This change in the position of the gauge becomes necessary, in order to produce spaces of the desired width, as will be readily understood by referring to the diagram shown in fig. 7, where the first cut produced is indicated by the letter o, and the second cut by the letter n.

If the gauge has no transverse motion, the second cut takes out only the triangle t, and the width of the space at its narrow end is equal to the width of the saw; but by imparting to the gauge a slight transverse motion, the second cut will be represented by dotted lines n', and a space of the desired width can thus be produced with ease and facility.

The inclination of the movable abutment is determined by the adjustable stops S. The abutments I I' are generally made of iron, and a space is cut out, at their bottom edges, to let the saws pass freely. The wood to be cut is thus not supported close to the saws, and the edges are liable to become rugged. This difficulty I have overcome by inserting into the edge of the abutment a lining, i, of wood or other soft material, which will not injure the saws if the same should come in contact therewith. This lining is provided with slots, just wide enough to let the saws pass, and the edges of the cuts produced become smooth and even.

The improvement of my machine will be seen by referring to the drawings on sheet 2. Figs. 4 and 5 show the boards with the "mortises." By working with the same edge of the board against the gauges F F', and the stops e being at the same distance from the saws, the bottoms of the mortises on each end will be at right angles with the edge worked from, and their width at the bottoms will be the same on both, and also any number of boards may be finished to the same size as to the inside of bottoms of the mortises, leaving any surplus of stuff on the outside of the box or work to be trimmed off.

This effect will be readily understood by referring to fig. 5, where the dotted lines show the irregularity of the edge and the shape of the mortise produced in that case. The same is true of the "tenons." By working in every operation from the same edge, the bottoms of the grooves are at the same angle with that edge of the board as the gauges are set to the saws, and by working from the same face, the thickness of the different boards cannot affect the size of the cut at the narrow side, where they fit the mortised board; and again, by working from the bottoms of the cuts on the ends, any number of boards may be made of the same distance between the bottoms, without having them sawed to an exact length.

The sliding carriages, gauges, &c., may be placed so as to have the work in a horizontal position to the saws, and the saws may be on a sliding carriage, and the work remain stationary when the cut is made.

The slides c, in the upright gauges J J', may be so constructed that they project beyond both edges of said gauges, and in this case the gauges are double acting, so that by shifting the gauges in the abutments from one side of the saws to the other, the tenons can be finished from the same face and from the same edge of the board; whereas, if the gauges remain on the same side of the saws, and the board is turned over, after the tenons in one edge thereof have been finished the tenons on the opposite edge will be cut from the same face of the board, but not from the same edge; and, if the edges of the boards are not parallel, the tenons will not become correct, those on one edge being in this case at right angles with one edge, and those on the opposite edge at right angles with the opposite edge. This disadvantage is obviated by my double-acting slide.

Having thus described my invention, what I claim as new, and desire to secure by Letters Patent, is—

1. The within-described method of cutting dove-tails, by working from the bottoms of the grooves, or of the spaces between the "tenons," consisting of the adjustable stops e, in the slides of the upright gauges F J, or any equivalent means which will produce the same result.

2. The adjustable stops e, extending down into the "grooves" or spaces between the tenons, and secured in the slides c, which are movable up and down on the upright gauges F J, substantially as and for the purpose set forth.

3. The slotted bracket h, in combination with the fulcrum-pin g of the swinging abutment I', substantially as and for the purpose described.

4. The combination of an abutment, I or I', with an upright gauge, F or J, movable in one direction, and provided with a slide, c, which is movable in a direction at right angles to the motion of the gauge, substantially as and for the purpose set forth.

5. The double-acting vertically-movable slides c in the upright gauges J J', substantially as and for the purpose described.

6. The arrangement of two abutments, I I', extending across the carriage H in different directions, and at angles which are supplements to each other, said abutments being provided with upright horizontally-adjustable gauges J J', and vertically-adjustable slides c, substantially as and for the purpose set forth.

This specification signed by me, this 16th day of March, 1868.

ROSCOE J. GOULD.

Witnesses:
W. HAUFF,
E. F. KASTENHUBER.